Sept. 10, 1963    A. DIXON    3,103,067
PROCESS OF SOLDERING TO A CERAMIC OR GLASS BODY
Filed Aug. 13, 1959

WITNESSES
Edwin C. Bassler
Robert C. Baird

INVENTOR
Austin Dixon
BY
Frederick A. Shapoe
ATTORNEY

United States Patent Office 3,103,067
Patented Sept. 10, 1963

3,103,067
PROCESS OF SOLDERING TO A CERAMIC
OR GLASS BODY
Austin Dixon, Westmoreland City, Pa., assignor to Westinghouse Electric Corporation, East Pittsburgh, Pa., a corporation of Pennsylvania
Filed Aug. 13, 1959, Ser. No. 833,463
8 Claims. (Cl. 29—473.1)

This invention relates to novel solder compositions and processes employing high frequency vibrations for applying such compositions to glass, ceramics, refractory metals, and the like in order to produce highly adherent metal coatings on such bodies.

It has been extremely difficult to apply adherent metal coatings to glass, ceramics and many refractory metals such as stainless steel, chromium, molybdenum and the like. It has been exceptionally difficult to secure a highly adherent bond regularly and consistently on such materials. It is believed that the difficulties in securing highly adherent bonds arise in part from the fact that these bodies have on their surfaces oxides which are resistant to bonding to molten metal coatings.

It has long been desirable, particularly in the electrical industry, to be able to apply to ceramic, glass and various metal and metalloid members, metallic coatings which can be soldered to in order to provide for attaching of electrical leads and for applying thereto by brazing or soldering support members, flanges, structural members and the like in order to prepare various structures. Thus, for example, it has been a considerable problem to attach electrical leads to oxide members including glasses, titanates such a barium titanate, and ferroelectric materials in producing thermistors, resistors and other electronic components. Furthermore, in the electrical industry there are various members comprising a glass or ceramic base to which is applied a relatively thin electrically conductive coating, for example, tin chloride coatings, which coatings are subjected to an electrical potential in order to produce heat over the surface of the glass or ceramic body or to create light, for example, in electro-luminescent cells. The attaching of electrical leads at predetermined portions of these glass or ceramic bodies so as to secure a reliable bond that will withstand ordinary wear and tear has been a difficult matter.

It is an object of the present invention to produce a novel solder composition comprising from 0.05% to 10% by weight of at least one alkaline earth metal selected from the group consisting of magnesium, calcium and barium and the balance being tin, lead and/or silver with up to 20% zinc, up to 10% copper, and up to 20% indium, the solder when applied to surfaces of members of glass, ceramics, refractory metals, and other materials in the molten state and subjected to high frequency vibrations will wet and adhere to the members to which it is applied to produce thereon a well bonded metal coating.

Another object of the invention is to provide a process for producing a highly adherent metal coating on a body, such coating comprising a solder having as an essential ingredient magnesium, calcium and/or barium in amounts of not in excess of 10% and the balance including various solder metal components, the applied solder being melted without use of a flux and treated with high frequency vibrations while in contact with the body surface for a period of time so as to wet the body and adhere to it tenaciously.

A still further object of the invention is to provide for soldering metals to bodies of ceramics, glasses and refractory metals by first pre-coating the body ceramic, glass or refractory metal with a solder comprising from 0.05% to 10% by weight of magnesium, calcium and/or barium, the balance comprising tin, lead and/or silver with additions of other metals, such molten solder being treated with high frequency vibrations for a period of time to produce a well bonded metal coating, thereafter applying a second solder whose melting point is below the melting point of the first metal coating solder and uniting the desired metal member to the body by the second solder.

Other objects of the invention will in part be obvious, and will in part appear hereinafter. For a better understanding of the nature and objects of the invention reference should be had to the following detailed description and drawing in which.

Figure 1:
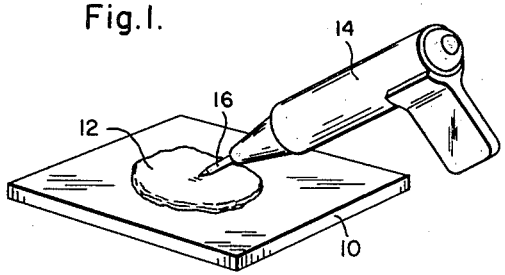
FIGURE 1 is a view in perspective of a member being coated with a solder.

Briefly, the present invention comprises a novel solder composition which includes as a critical component from 0.05% to 10% by weight of at least one alkaline earth metal from the group consisting of magnesium, calcium and barium and the balance comprising tin, lead and/or silver, along with from 0 to 20% of zinc, from 0 to 10% of copper, and from 0 to 20% of indium. The solder may include small amounts of other metals that are not detrimental to it suse as a solder, for example, bismuth, cerium, and cadmium may be present in small amounts. The solder composition so produced is then applied to a surface of a glass, ceramic or refractory metal body, melted while in contact with such body and then subjected to high frequency vibrations of from 5,000 to 100,000 cycles per second for a period of time until wetting of the body has occurred. Usually this will occur in a few seconds. It has been found that if sufficient vibratory energy is applied in the amount of from 100 to 1,000 watts per square inch of the surface that the applied solder will react with the oxides and other materials at the surface of the body so as to lift them or even reduce them and the solder will wet the surface of the body wherever the vibratory energy has been effective. No flux is required. On solidification, a uniform-appearing well-bonded metal coating of the solder on the body is produced. For some purposes this solder coating may be employed to bond other materials to the body. However, more usually thereafter, a second solder may be employed, providing that its melting point is somewhat less than the melting point of the first solder composition. The second solder is subjected to a temperature less than the temperatures that were employed during the vibratory treatment of the initial metal coating. Such second solder, with or without a flux, when melted will wet, spread on and adhere well to the original metal coating. Such second solder may be employed to solder leads, metal parts such as flanges, braces, supports and the like to the original body of glass, ceramic, refractory metal or the like.

The solder compositions of the present invention may be applied without use of a flux to a wide range of materials which have been found difficult to solder to consistently and effectively. Thus, soda glass, lime glass, borosilicate glass and lead glasses all may be soldered to effectively if a metal coating is applied thereto employing the novel solder compositions of the present invention as a preliminary step. The novel solders of the present invention may be applied to various ceramics and porcelains. For example, the conventional calcium aluminum silicate electrical porcelains in the form of bushings and other electrically insulating members may be pre-coated wherever desired with such solder compositions. Zircon porcelains and steatite porcelains may be similarly treated so that electrical conductors, flanges and other supports may be applied thereto. The porcelains are preferably unglazed at the treated surfaces, though the solders of this invention will adhere to the glazes. Similarly the solders of the present invention have been found to adhere effectively to stainless steels, to chromium metal, both solid and plated, to nickel and molybdenum. Semiconductor metals such as silicon and germanium also may be soldered effectively by emloying the compositions of the present invention. Ferrites such as barium ferrite and thermistor materials such as barium titanate can be provided with metal coatings in accordance with the invention.

Numerous lead, tin and silver base solders and brazing alloys may be combined with as little as 0.05% and up to 10% of magnesium, barium or calcium or any combination or two or more in producing the solder alloys of the present invention. The lead base alloys have produced good solders in the practice of the invention. In particular, a 60% lead, 40% tin alloy combined with from 0.05% to 10% magnesium has produced excellent metal coatings on glasses, ceramics and many refractory metals. In addition, solders comprising 90% tin and 10% zinc have been combined with varying proportions of magnesium with excellent results. Pure tin may be employed in combination with magnesium or magnesium and calcium to produce good results as a coating solder for the purpose of the present invention. A solder was prepared from approximately 97% lead, 2.75% silver, the balance approximately 0.25% comprising various impurities, and to this solder there was added varying amounts of magnesium, and such magnesium containing compositions have been found highly effective for coating glasses, ceramics and refractory metals.

Referring to FIGURE 1 there is illustrated the practice of the process of the present invention. A body 10, for example of glass, has applied to one surface thereof a quantity of the solder alloy composition 12 of the present invention comprising as a critical component from 0.05% to as much as 10% by weight of magnesium, calcium, barium or any combination of these three alkaline earth metals. A vibratory tool 14 which comprises a suitable transducer which is capable of energizing the tip 16 thereof with vibrations in the range of at least 5,000 cycles per second to as much as 100,000 cycles per second is employed for treating the molten solder 12 applied to a surface of the body 10. The tip 16 is preferably heated to a temperature above the melting point of the solder composition 12, while it is applying vibratory energy thereto.

It should be understood, however, that the solder composition 12 may have been previously melted and applied to the body 10 as a molten coating or the member 10 may be dipped or immersed in a vessel containing molten solder 12 and the tool tip 16 applied to desired portions of the surface to cause the solder 12 to wet and adhere thereto.

The explanation for the excellent adherence of the solder compositions of the present invention to various materials normally considered practically nonsolderable is not completely understood. It is believed that the alkaline earth metals, magnesium, calcium and barium may react to some extent with some of the refractory surface oxides to modify or to reduce them. The solder components may possibly lift the oxides which prevent wetting under the cavitating influence of the tool tip when subjected to the high frequency vibrations. Regardless of the explanation, it has been found that when the tool tip 16 is applied to an area of one square inch for a period of time of from 1 to 50 seconds, for example, so as to apply to a square inch from 100 to 1,000 watts of vibratory energy that the solder 12 will wet and adhere in an exceptional manner to the surfaces. The solder 12 on cooling will form a relatively smooth highly adherent coating over the surfaces to which it has been applied while under the influence of vibratory energy from the tool tip 16.

It should be understood that the tool 14 may assume any one of numerous commercially available forms. The area covered by the tool tip, which ordinarily will be flat, depends on the amount of energy which is capable of being supplied thereto by the ultrasonic transducer. Also, if a heating element is applied it should be of sufficient capacity to maintain the temperatures of the molten solder 12 at a point such that it will be completely molten and will be able to wet the surfaces of the body 10 at all times while the vibratory tool is functioning.

Only a thin coating of the solder composition of the present invention need be applied to the surfaces of the members in order to produce thereon the desired initial metal coating. Usually these coatings will be relatively thin, for example of the order of a few mils thickness.

Ordinarily, a second solder which comprises one of the conventional solders, with or without a flux, will be applied to such metal coating 12 in making a bond to a lead or other member. In many cases the lead or metal member may be soldered directly to the molten coating 12.

The surface of the member 10 will be subjected to the normal cleaning to remove any oils, greases, and loose scale, excessive oxides or other undesirable matter that may be present thereon. However, no unusual cleaning need be effected. Furthermore, no flux is required which is ordinarily required by conventional soldering techniques.

Once the surfaces of the member 10 have been precoated with a tenaciously adherent metal coating of the solder composition 12 under the influence of vibratory energy the solder coating may be employed as a base for soldering members thereto using conventional solders. One precaution, however, should be observed, namely, that the second solder should have a lower melting point than the composition 12 and that the second solder should not be heated to a temperature exceeding the temperatures employed in producing the initial coating 12.

Figure 2:
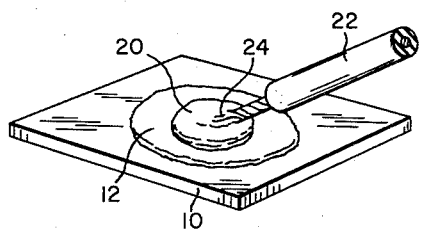
FIG. 2 is a view in perspective showing a member to which a metal lead is being soldered; and, FIG. 3 is a graph plotting relative strength of metallic bonds against percentages of magnesium for two different solder compositions.

Referring to FIG. 2 of the drawing there is illustrated the member 10 to which has been previously applied a tenaciously adherent metal coating 12 of the novel solders of the present invention. A second solder 20 comprising a lower melting point solder than the solder composition 12 has been applied thereto. An electrical lead, comprising a copper conductor 22 which it is desired to solder to the surface of member 10, is initially pretinned or otherwise treated so as to produce the tinned terminal 24. The tinned terminal 24 is applied to the second solder 20 and a hot soldering iron is applied to melt the second solder 20 whereby to effect a bond between the tinned terminal 24 and the metal coating 12. Only a brief heating is necessary to effect a suitable and highly satisfactory metallic bond of the lead to the member 10.

The solder composition 12, as shown in FIG. 1 of the drawing, may be prepared in any one of several manners. It may be desirable to combine all of the components beforehand to produce the desired solder composition in a melting pot, usually under a protective atmosphere to prevent undue oxidation of any of the components of the solder. The melt may be then cast or otherwise converted to a solid form such as wire, rod, powder, pellets, sheet and strip as may be required for the particular application in mind. In some instances, however, the solder composition was prepared by applying a thin ribbon of magnesium to the surface of a glass plate, thereafter, a strip of 60 lead-40 tin solder was applied over the magnesium ribbon and a hot soldering iron was applied to the two compositions at a temperature sufficient to cause the melting of the lead-tin solder and its combination with the magnesium ribbon. The hot soldering iron when subjected to vibrations produced the desired alloy composition in situ and thereafter, upon moving the vibrating soldering iron tip while subjected to vibration in a range of 5,000 cycles per second and higher, there was produced a well wetted and highly adherent coating of the solder on the glass plate.

Numerous solder compositions may be prepared in accordance with the present invention. The following compositions have been found to be highly satisfactory for the purpose of the present invention.

*Example I*

A 60 lead-40 tin solder was combined with magnesium by melting under argon in the proportions of 95 parts by weight of the lead-tin solder to 5 parts by weight of magnesium. Bars of the solder were cast from the melt. The resulting solder was found to be highly satisfactory for precoating ceramics, glass and numerous refractory metals.

*Example II*

A solder composition was prepared by melting 5% by weight of magnesium and 95% by weight of a 90 tin-10 zinc solder. This composition was found to be highly effective in coating ceramics and glass.

*Example III*

Pure tin was combined to varying proportions of magnesium, 2% and 5% being specific examples. All of these compositions were found to be highly effective in the coating of ceramics and glass under the influence of high frequency vibrations.

*Example IV*

A solder comprising 50% lead, 45% silver, indium 4.5% and 0.5% magnesium is effective in soldering to glass and ceramics.

A second solder comprising 20% silver, 45% lead, 10% zinc, 20% tin and the balance 5% magnesium is suitable for practicing the present invention.

*Example V*

A solder comprising 40% lead, 40% tin, 10% copper, 8% silver and 1% magnesium and 1% calcium is satisfactory for practice of the present invention.

*Example VI*

A solder comprising 45% silver, 15% copper, 16% zinc, 20% lead and 2% magnesium, 1% barium and 1% indium may be employed in practicing the present invention.

The solders of the present invention which are employed for coating ceramics, glass or refractory metals are preferably so prepared that the calcium, magnesium and/or barium does not exceed approximately 2% if the members are to be exposed to the open air. If the solders comprise more than 2% of the alkaline earth metals, it is usually desirable that the joints be protected by being enclosed in a sealed casing and only in contact with a vacuum or an inert atmosphere such as nitrogen, hydrogen, argon or other inert gas. In some instances the soldered joints, after being prepared have been coated with a protective varnish or paint to prevent moisture from coming in contact with the magnesium, calcium or barium containing solder joint. Running water or condensing moisture is not desirable in contact with solders containing more than 2% of the magnesium or other alkaline earth metal.

Figure 3:
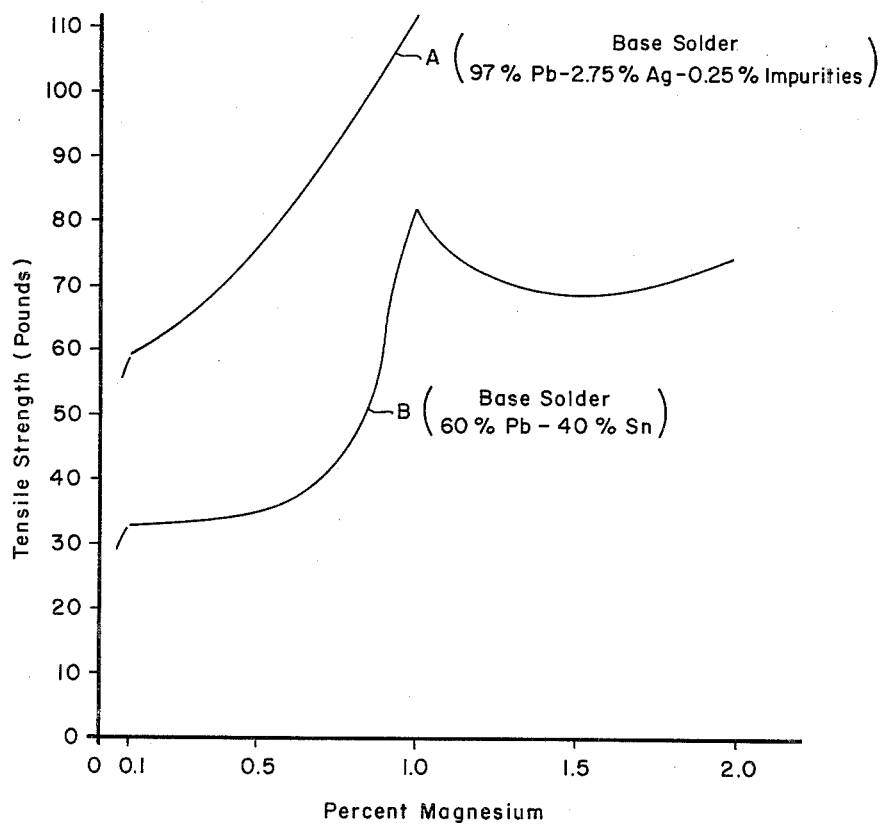

The great improvement arising from the inclusion of magnesium in the bond strength between the solder compositions of the present invention with glass or ceramic material is illustrated in the graphs of FIG. 3. Curve A was prepared by adding to a base solder comprising 97% lead, 2.75% silver and 0.25% impurities varying percentages of magnesium as indicated by the horizontal ordinate of the graph. It will be noted that curve A shows a very substantial increase in the strength of the bond between the solder and the glass plate when as little as 0.1% of magnesium is incorporated in the solder. The solder was applied to ordinary soda glass by applying a small portion of the solder composition and melting it at a temperature of approximately 600° F. using an ultrasonic soldering tool which was subjected to ultrasonic vibrations of 28,000 cycles per second. After 30 seconds a well tinned coating was produced in every case where the solders contained at least 0.1% of the magnesium. Thereafter, a pre-tinned stranded copper wire was soldered to the resultant solder coating on the glass employing a 60-40 lead-tin solder containing a rosin flux. The load required to separate the copper wire from the glass was measured and this load is indicated on the vertical ordinate. Without any magnesium in the solder the wetting of the base solder to the glass was poor. Furthermore, the bonds to the glass were very erratic, some being totally ineffective so that even a slight tug would detach the metal coating from the glass. It will be noted that the strength of the bond increased as the amount of magnesium was increased to 1%. Above the 1% magnesium level the strength of the bond remained relatively constant up to 10% magnesium.

Curve B of FIG. 3 was prepared by adding to a base solder comprising 60% lead, 40% tin, the indicated proportions of magnesium. This solder was applied with an ultrasonic soldering iron such as used for preparing the joints from which curve A was derived. Without magnesium the 60-40 lead-tin solder had practically no strength and in many cases the copper wire would fall off on simply touching it after the soldering operation was completed. However, adding approximately 1/10% by weight of magnesium resulted in bonds that consistently required in excess of thirty pounds to pull the wire from the glass. When 1% and more of magnesium was present in this solder, the strength of the bonds varied from 65 to 80 pounds. The following examples illustrate the practice of the invention in more detail.

*Example VII*

A solder was prepared by incorporating 5 parts by weight of magnesium to 95 parts by weight of a 60 lead, 40% tin solder. This composition was applied to a glass plate with a soldering iron having a 5/8 inch diameter stainless steel tip, approximately 3.6 inches long so that its length was approximately ½ wavelength at a frequency of 27,000 cycles. The end of the work tip was flat and was heated to a temperature approximately 650° F. using an electrical heating element therein. The 60-40 solder was applied to the surface of a glass plate comprised of a common sodium-calcium glass. The tip was worked over the surface of the glass plate for a period of time approximately 8 seconds over an area of 1 square inch, so that some 200 watts of ultrasonic energy was applied thereto. Excellent coating of the glass surface was obtained with this solder. Good wetting and good adherence was noted. Thereafter, a low melting point solder melting at approximately 130° C. was applied to bond a lead to various places of the coated glass plate. Each of the solder joints held very well and were excellent conductors electrically.

*Example VIII*

Pure tin combined with 5% by weight of magnesium was applied to a glass plate as set forth in previous Example VII. The solder exhibited good wetting and good adherence and excellent electrical joints between copper leads and the glass plate were obtained.

*Example IX*

A solder comprising 5% magnesium and 95% by weight of a 90-10 tin-zinc alloy. This alloy was applied by the ultrasonic tool of Example VII for a period of time of 10 seconds to a glass plate. Good wetting and good adherence of the metal coating was observed. Thereafter electrical leads were soldered to this coating and were found to be firmly attached thereto. Without the magnesium the solder of this example exhibited poor wetting and the adherence was extremely poor so that on cooling and applying a second solder thereto the electrical lead pulled off easily.

*Example X*

A porcelain bushing of a diameter approximately two inches comprising conventional electrical porcelain was pre-coated with a 97% lead-2.75% silver-0.25% impurity solder alloyed with approximately 1/10% of magnesium. A ring of this solder was applied to the bushing along a circumference thereof over a distance of one inch in the axial direction of the bushing. In approximately one minute of ultrasonic treatment a highly adherent solder coating was obtained. Thereafter, a flange was soldered to this coating by employing a conventional 60-40 lead-tin solder. In tests made to determine the strength of the flange it was found that almost invariably the porcelain would rupture before the bond between the flange and the solder would be broken.

*Example XI*

The solder composition of Example X was applied to molybdenum plates. It was found to pre-coat the plates satisfactorily so that soldering using conventional lead tin solders was readily carried out.

It will be understood that the above descriptions are exemplary and not limiting.

I claim as my invention:

1. In the process of producing a highly adherent metal coating on a body, particularly on a body such as glass and ceramic having an oxide on its surface which renders soldering difficult, the steps comprising applying to a surface of the body a molten solder containing as its essential ingredients from 0.05% to 10% by weight at least one alkaline earth metal from the group consisting of magnesium and barium, from 0 to 20% zinc, from 0 to 10% copper, from 0 to 20% indium and the balance being at least one metal selected from the group consisting of tin, lead and silver, and applying vibrations of a frequency of from 5,000 to 100,000 cycles per second to the molten solder for a period of time of the order of from 1 to 50 seconds to apply on the order of from 100 to 1000 watts of energy per square inch of surface being soldered to cause the molten solder to react with the body and to wet the surface of the body whereby on solidification a strong well-bonded metal coating on the body is produced.

2. The process of claim 1, wherein the molten solder contains from 0.05% to 2% by weight of the alkaline earth metal to produce a metal coating which will not be affected adversely by exposure to the atmosphere.

3. In the process of soldering a metal member to the surface of a body having on its surface an oxide selected from the group consisting of glass and ceramics, the steps comprising applying directly to said oxide surface of the body a molten solder consisting of, as its essential ingredients, from 0.05% to 10% by weight at least one alkaline earth metal from the group consisting of magnesium and barium, from 0 to 20% zinc, from 0 to 10% copper, from 0 to 20% indium and the balance being at least one metal selected from the group consisting of tin, lead and silver, and applying vibrations of a frequency of from 5,000 to 100,000 cycles per second to the molten solder for a period of time of the order of from 1 to 50 seconds to apply on the order of from 100 to 1000 watts of energy per square inch of surface being soldered to cause the molten solder to react with the body and to wet the surface of the body and thereafter applying a second solder to the applied metal coating, the second solder having a melting point below that of the metal coating, and soldering the metal member by means of the second solder to the applied metal coating by heating the second solder to a temperature above its melting point but below the melting temperature of the applied metal coating.

4. In the process of producing a highly adherent metal coating on a body, particularly on a body such as glass and ceramic having an oxide on its surface which renders soldering difficult, the steps comprising applying to a surface of the body a molten solder containing as its essential ingredients from 0.05% to 10% by weight, of magnesium, from 0 to 20% zinc, from 0 to 10% copper, from 0 to 20% indium and the balance being at least one metal selected from the group consisting of tin, lead and silver, applying a vibrating tool vibrating at a frequency of at least 5,000 cycles per second, the portion of the tool in contact with the molten solder being at a temperature of at least at the melting point of the solder, the vibrating tool being applied for a period of time to apply in the order of from 100 to 1,000 watts of high-frequency energy per square inch of surface being coated, to cause the molten solder to react with the body and to wet the surface of the body whereby on solidification a strong well-bonded metal coating on the body is produced.

5. In the process of producing a highly adherent metal coating on a body, particularly on a body such as glass and ceramic having an oxide on its surface which renders soldering difficult, the steps comprising applying to a surface of the body a molten solder containing as its essential ingredients from 0.05% to 10% by weight of magnesium, from 0 to 20% zinc, from 0 to 10% copper, from 0 to 20% indium and the balance being at least one metal selected from the group consisting of tin, lead and silver, and applying vibrations of a frequency of from 5,000 to 100,000 cycles per second to the molten solder for a period of time of the order of from 1 to 50 seconds to cause the molten solder to react with the body and to wet the surface of the body whereby on solidification a strong well-bonded metal coating on the body is produced.

6. In the process of soldering to a surface of a ceramic or glass body, the steps comprising, applying directly to the surface of the body a molten solder consisting of, as its essential ingredients, from 0.05% to 10% by weight at least one alkaline earth metal from the group consisting of magnesium and barium, from 0 to 20% zinc, from 0 to 10% copper, from 0 to 20% indium and the balance being at least one metal selected from the group consisting of tin, lead and silver, and applying vibrations of a frequency of from 5,000 to 100,000 cycles per second to the molten solder for a period of time of the order of from 1 to 50 seconds, the vibrations applying on the order of from 100 to 1,000 watts of energy per square inch of the surface, to cause the molten solder to react with the surface and to wet the surface, whereby on solidification a strong well-bonded metal coating on the body is produced.

7. In the process of soldering a metal member to a surface of a ceramic or glass body the steps comprising, applying directly to the surface of the body a molten solder consisting of as its essential ingredients, from 0.05% to 10% by weight at least one alkaline earth metal from the group consisting of magnesium, and barium, from 0 to 20% zinc, from 0 to 10% copper, from 0 to 20% indium and the balance being at least one metal selected from the group consisting of tin, lead and silver, and applying vibrations of a frequency of from 5,000 to 100,000 cycles per second to the molten solder for a period of time, the vibrations applying on the order of from 100 to 1,000 watts of energy per square inch of surface, to cause the molten solder to react with the surface and to wet the surface, and thereafter soldering the metal member to the metal coated body by applying it thereto by means of a second solder whose melting point is below the melting point of the metal coating, whereby on solidification a strong well-bonded metal coating on the body is produced.

8. A body selected from the group consisting of glass and ceramics having a highly adherent metal coating bonded directly to the surface thereof, the metal coating consisting essentially of from 0.05% to 10% by weight of at least one alkaline earth metal selected from the group consisting of magnesium and barium, up to 20% zinc, up to 10% copper, up to 20% indium and the balance being at least one metal from the group consisting of tin, lead and silver, the metal coating having been applied to the body by the process of claim 1.

References Cited in the file of this patent

UNITED STATES PATENTS

| | | |
|---|---|---|
| 803,920 | Moffett | Nov. 7, 1905 |
| 906,383 | Carroll et al. | Dec. 8, 1908 |
| 1,158,675 | Frary et al. | Nov. 2, 1915 |
| 1,335,024 | Peschko | Mar. 30, 1920 |
| 1,360,045 | Stenquist | Nov. 23, 1920 |
| 1,884,665 | Greiner | Oct. 25, 1932 |
| 2,230,205 | Rowland et al. | Jan. 28, 1941 |
| 2,397,400 | Barwich | Mar. 26, 1946 |
| 2,426,650 | Siviam | Sept. 2, 1947 |
| 2,829,116 | Alexander | Apr. 1, 1958 |
| 2,891,178 | Elmore | June 16, 1959 |

FOREIGN PATENTS

| | | |
|---|---|---|
| 911,552 | France | Mar. 18, 1946 |

OTHER REFERENCES

The Properties of Tin Alloys, pub. by Tin Research Inst. (England).

Circular of The Bureau of Standards, No. 78, pp. 6 and 7, issued Jan. 28, 1919, by the Department of Commerce, Washington, D.C.